United States Patent

Wulff-Döring et al.

[11] Patent Number: 6,034,029
[45] Date of Patent: Mar. 7, 2000

[54] MONOCLINIC ZIRCONIUM DIOXIDE HAVING A LARGE SURFACE AREA

[75] Inventors: Joachim Wulff-Döring, Frankenthal; Wolfram Stichert, Steinbach; Ferdi Schueth, Oberursel, all of Germany

[73] Assignee: BASF Aktiengesellschaft, Ludwigshafen, Germany

[21] Appl. No.: 08/992,569

[22] Filed: Dec. 17, 1997

[30] Foreign Application Priority Data

Dec. 20, 1996 [DE] Germany ............................ 196 53 629

[51] Int. Cl.$^7$ .............................. B01J 23/00; B01J 21/08; C01G 25/02; C01B 17/96
[52] U.S. Cl. ........................... 502/308; 502/242; 423/608; 423/544
[58] Field of Search ................................ 502/308, 242; 423/608, 544

[56] References Cited

U.S. PATENT DOCUMENTS

| | | | |
|---|---|---|---|
| 4,765,970 | 8/1988 | Kato ......................................... | 423/608 |
| 4,820,593 | 4/1989 | Egerton et al. ........................... | 428/698 |
| 4,822,575 | 4/1989 | Ngian et al. .............................. | 423/82 |
| 4,977,114 | 12/1990 | Horinouchi et al. .................... | 501/104 |
| 5,030,601 | 7/1991 | Michel et al. ............................ | 501/103 |
| 5,104,832 | 4/1992 | Michel et al. ............................ | 501/103 |
| 5,147,842 | 9/1992 | Funabiki et al. ........................ | 502/304 |
| 5,380,691 | 1/1995 | Popa .......................................... | 502/170 |
| 5,420,086 | 5/1995 | Brandau et al. ......................... | 501/103 |
| 5,447,898 | 9/1995 | Blankenstein et al. ................. | 502/349 |
| 5,628,790 | 5/1997 | Davidson et al. ....................... | 623/2 |
| 5,814,576 | 9/1998 | Yamamoto ............................... | 502/303 |

FOREIGN PATENT DOCUMENTS

| | | |
|---|---|---|
| 207 469 | 1/1987 | European Pat. Off. . |
| 397553 | 11/1990 | European Pat. Off. . |
| 716 883 | 6/1996 | European Pat. Off. . |
| 2 590 887 | 5/1987 | France . |
| 2661171 | 10/1991 | France . |

OTHER PUBLICATIONS

Database WPI, Section Ch, Week 8833, Derwent Pubs., Class E32, AN 88–233802, XP002061867 (English abstract of SU 1370079, Jan. 30, 1988).
Chem. Abst., vol. 88, No. 22, May 29, 1978, AN 163006n.
Abstract AppliedCatalysis 57 (1990), 127–148.
Catalysis Today 20 (1994), 199–218.
Catalysis today 20 (1994), 295–312.

Primary Examiner—Gary P. Straub
Assistant Examiner—Cam N. Nguyen
Attorney, Agent, or Firm—Keil & Weinkauf

[57] ABSTRACT

Zirconium dioxide which is monoclinic to at least 80% by weight and has a BET surface area of at least 100 m$^2$/g is prepared by admixing aqueous zirconium salt solutions with ammonia, drying and calcining the precipitation product, aging the precipitation product, prior to drying, in aqueous phase at from 0 to 300° C. and carrying out the calcination at from 200 to 600° C.

6 Claims, 1 Drawing Sheet

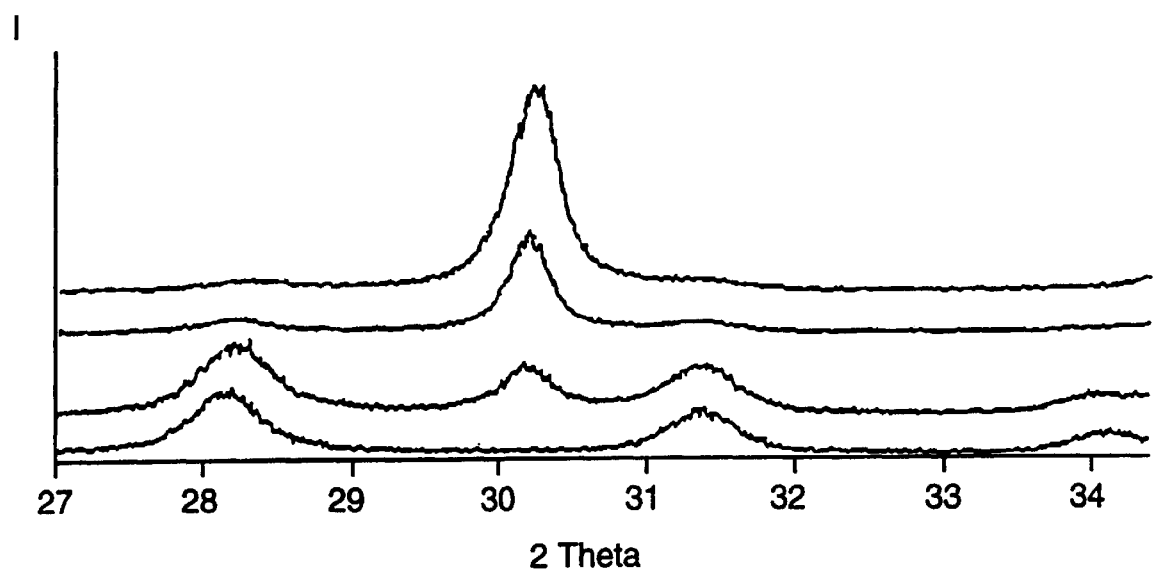

MONOCLINIC ZIRCONIUM DIOXIDE HAVING A LARGE SURFACE AREA

The invention relates to monoclinic zirconium dioxide having a large surface area, to a process for the preparation thereof, to molded articles made therefrom and to its use as a catalyst or catalyst support.

P.D.L. Mercera et al., Applied Catalysis 57 (1990), pp. 127 to 148, describe studies on the structure and texture of zirconium dioxide precipitation products. The gel precipitation method afforded zirconium dioxide having a well-developed mesoporous texture, although the porous texture was unstable. This manifested itself in the rapid loss of the initially high specific surface area, in particular upon calcination. A solution of zirconyl chloride was admixed dropwise with ammonia until a pH of 10.0 had been reached. The precipitation product was aged in the mother liquor for 65 hours, then filtered, washed and dried in air at 110° C. for 20 hours. The calcination was carried out at up to 850° C. The product obtained was a mixture of monoclinic phase and metastable tetragonal or cubic phase. At temperatures below 650° C. the volume fraction of monoclinic zirconium dioxide was less than 80%. Calcination predominantly produced the tetragonal phase rather than the monoclinic phase.

T. Yamaguchi, Catalysis Today 20 (1994), pp 199 to 218, describes the use of zirconium dioxide as a catalyst or catalyst support. The zirconium dioxides are obtained by precipitation. The fraction of tetragonal phase is above 15% at calcination temperatures of 400° C. and about 10% at calcination temperatures of 600° C. At the same time, the surface area at this temperature drops to about 25 m$^2$/g. As the calcination temperature is increased, the surface area drops very sharply. It is stated that aging over a long period results in the preferential formation of the monoclinic form after calcination. However, the surface areas obtained for this zirconium dioxide are very low.

A. Clearfield, Catalysis Today 20 (1994), pp 295 to 312, describes the structures of crystalline water-containing zirconium dioxide and methods for its preparation. Zirconium dioxide is prepared by precipitation of soluble zirconium salts. Within a precipitation pH range of from 8 to 12 a proportion of about 30% of tetragonal zirconium dioxide is observed, the remainder being monoclinic. Nothing is said about the surface areas obtained.

FR-A 2 590 887 describes zirconium dioxide compositions and methods for preparing them. Precipitation of a zirconyl nitrate solution with ammonium, followed by washing, drying for 36 hours at 150° C. and calcination for 1 hour at 550° C. affords monoclinic zirconium dioxide with a specific surface area of 80 m$^2$/g.

EP-A-0 716 883 describes catalysts or supports which essentially consist of monoclinic zirconium dioxide. The monoclinic zirconium dioxide is prepared by precipitation of a zirconium salt solution with ammonia, the zirconyl nitrate or zirconyl chloride solution being added to an aqueous ammonia solution while the pH decreases from 14 to 6. The precipitation product is then dried, calcined and tabletted. The zirconium dioxide molded articles thus obtained have a high proportion of monoclinic crystal structure. The proportion of monoclinic zirconium dioxide can be increased by drying under a water vapor partial pressure of from 0.2 to 0.9 ar at 120° C. over a period of about 16 ours. They have BET surface areas of up 91 m$^2$/g.

For certain catalytic applications monoclinic zirconium dioxide is used preferentially, which should have as large a BET surface area as possible, in addition to as large a proportion of monoclinic phase as possible.

The preparation of monoclinic zirconium dioxide having a relatively high surface area encounters major difficulties, however, since precipitations usually produce the water-rich α-type of zirconium hydroxide, from which the metastable tetragonal zirconium dioxide is formed which is transformed into the monoclinic modification only above 650° C. and during calcination undergoes a marked decline in its surface area.

It is an object of the present invention to provide a zirconium dioxide which is largely monoclinic and has a high BET surface area.

According to the invention a zirconium dioxide is provided which is monoclinic to at least 80% by weight and has a BET surface area of at least 100$^2$/g.

According to the invention this involves a BET surface area which is from 100 to 350, preferably from 100 to 200, in particular from 100 to 160 m$^2$/g, while the zirconium dioxide is preferably monoclinic to at least 85% by weight, particularly preferably to at least 90% by weight, in particular to at least 95% by weight, where the proportion of the monoclinic zirconium dioxide can be determined from the X-ray diffraction pattern of the product.

The accompanying drawing shows:

in FIG. 1 X-ray diffraction patterns for tetragonal phases, monoclinic phases and mixed phases. I denotes the intensity.

It was found, according to the invention that largely monoclinic zirconium dioxide having a large surface area is obtained if the precipitation product obtained after precipitation of a zirconium salt solution with ammonia is aged in aqueous phase. In the process, the tetragonal zirconium dioxide produced initially is converted into monoclinic zirconium dioxide. Then the precipitation product is dried and calcined.

The invention also relates a process for preparing zirconium dioxide as claimed in claim 1 by admixing aqueous zirconium salt solutions with ammonia, drying and cacining the precipitation product, which comprises aging the precipitation product, prior to drying, in aqueous phase at from 0 to 300° C. and carrying out the calcination at from 200 to 600° C.

This aging is preferably carried out at from 20 to 250° C. for at least 2 hours, particularly preferably at from 70 to 250° C. for at least 24 hours. Depending on the temperature during aging the time can be varied. Low aging temperatures require longer times to effect complete conversion of the tetragonal zirconium dioxide into monoclinic zirconium dioxide.

By preference the initial step involves the preparation, from a water-soluble zirconium salt such as zirconyl chloride or a water-insoluble zirconium salt such as zirconium carbonate, and an acid, of a from 0.01 to 5, preferably from 0.1 to 5, in particular from 0.25 to 5 mol% strength solution containing the zirconyl radical. This solution is then precipitated at from preferably 0 to 100° C., particularly preferably from 10 to 80° C. by the addition of an aqueous ammonia solution. The aqueous ammonia solution preferably has an ammonia concentration of from 0.01 to 30, particularly preferably from 0.1 to 30% by weight. A relevant procedure is described in EP-A-0 716 883.

The pH after the precipitation is preferably from 4 to 10, particularly preferably from 4 to 6.

To age the precipitation product, it is left to stand, together with the aqueous phase, as a rule at the temperature specified in the examples.

The aging time in this context is preferably from 1 to 1000, particularly preferably from 5 to 500 hours. Calcination preferably takes place over a period of from 0.5 to 10, particularly preferably from 1 to 6 hours, if the temperature is in the range of from 200 to 450° C., preferably from 250 to 400° C.

This aging step, which can be carried out simply by the mixture produced in the precipitation being left to stand, results in a high proportion of monoclinic zirconium dioxide with a high surface area.

The precipitation product can be washed on a nutsche or a filter press and can be largely freed from ammonia or ammonium salts. It is then dried and calcined at the specified temperature, the pressure optionally ranging from 0.01 to 1 bar. Further process details relating to precipitation, drying and calcination can be gathered from EP-A-0 716 883.

The zirconium dioxide according to the invention may also contain small amounts of further components which are already present in the precipitation solution. Relevant additions can also be introduced after the precipitation prior to aging and drying. To prepare sulfated zirconium dioxide, for example, the above-described process can be carried out, the aqueous phase being admixed with sulfuric acid, polysulfuric acid or water-soluble sulfates, said mixture optionally taking place before or after the precipitation. Preferably, the precipitation product obtained undergoes admixture after precipitation. To this end preference is given to the use of solutions of sulfuric acid, polysulfuric acid or water-soluble sulfates such as alkali metal sulfates or particular preference to ammonium sulfate, in concentrations of from 0.01 to 50, particularly preferably from 0.1 to 50% by weight. Drying and calcination takes place after admixture as described above.

The invention also relates to the sulfated zirconium dioxides having a sulfate fraction, calculated as $SO_4$, of from 0.05 to 10, preferably from 0.05 to 8, particularly preferably from 0.1 to 7% by weight, based on the sulfated zirconium dioxide, which has a BET surface area of at least 100 $m^2/g$ and in which at least 80% by weight at the zirconium dioxide is monoclinic. Preferred ranges for the surface area and the proportion of monoclinic zirconium dioxide are specified above.

The calcination is preferably carried out over a period of from 0.5 to 10, particularly preferably from 1 to 6 hours.

Particularly preferably, said aging is carried out at at most 210° C. and calcination at at most 400° C., in particular at an aging temperature of from 80 to 200° C. and a calcination temperature of from 250 to 400° C.

In the case of sulfated zirconium dioxides the calcination can be carried out at higher temperatures, compared with nonsulfated zirconium dioxides, since sulfation appears to result in stabilized surface areas.

From the zirconium dioxides according to the invention molded articles can be obtained by known methods, for example by compression-molding. These molded articles contain the zirconium dioxide according to the invention and may also contain conventional components such as binders, tabletting aids, release agents and other excipients. Preferably no further excipients are used. Methods useable for producing molded articles are described in EP-A-0 716 883. The molded articles may be present in any shape, examples being tablets, pellets, extrudates, granules, rings and other shapes customarily encountered when the pills are used as catalysts. Thus the molded articles can be furnished for use in a fluidized bed or as a fixed bed.

The zirconium dioxides according to the invention can be used as catalysts or catalyst supports. The catalysts may also comprise the novel zirconium dioxide as a support which is doped with from 0.01 to 30, preferably 0.1 to 20% by weight, of one or more catalytically active metals. Preferred catalytically active metals are the lanthanide elements. The supported catalysts, preferably monoclinic zirconium dioxide throughout, are preferably doped with from 0.1 to 10% by weight of lanthanum, cerium, praseodymium, neodymium, samarium, europium or mixtures thereof, possibly in oxide form. Particularly preferably from 1 to 8% by weight of lanthanum(III) oxide are present. Doping is generally effected by the zirconium dioxide impregnating with aqueous or alcoholic salt solutions of the lanthanides. These catalysts may additionally contain further dopants such as chromium, iron, yttrium, hafnium or manganese in amounts of from 0.01 to 10% by weight. The catalysts doped with lanthanides preferably do not contain such additives. Suitable catalysts of this type are described, for example, in DE-A-195 09 552, DE-A-44 43 704, DE-A-44 28 994, EP-A-0 716 070, DE-A-44 19 514.

Doping with metals such as nickel, copper, cobalt, palladium, platinum or manganese, chromium and other metals, and mixtures thereof is likewise possible.

Said doping can be effected by impregnation, coating or spraying of metals or metal salt solutions such as the nitrates, acetates or formates. Doping is preferably effected with transition metals.

The catalysts according to the invention can be used for a multiplicity of reactions. Examples include hydrogenations and/or dehydrogenations, Fischer-Tropsch syntheses, desulfurizations, isomerizations, polymerizations or steam reforming. These involve, in particular, the use of sulfated zirconium dioxide catalysts as superacids in isomerizations or polymerizations.

Further applications are known to those skilled in the art.

The invention is explained below in more detail by means of examples.

EXAMPLE 1

Zirconyl chloride (95%) was dissolved in water over the course of 5 minutes, resulting in a zirconium concentration of 0.34 mol. Addition of an aqueous solution of ammonia (Roth, about 25% strength) within a few seconds up to a final pH of 5 resulted in precipitation of the zirconium dioxide. After precipitation the mixture was stirred for an another 7.5 minutes and aged at 90° C. over a period as specified below, before the precipitate was filtered off, washed with distilled water and dried for 24 hours at 90° C. It was then heated to 550° C. at a heating rate of 1° C./min and kept at this temperature for 5 hours.

If no aging was carried out a tetragonal phase was obtained. Aging for 24 hours afforded a mixed phase containing a major proportion of tetragonal phase and a minor proportion of monoclinic phase. Aging for 144 hours resulted in a mixed phase containing a major proportion of monoclinic and a minor proportion of tetragonal phase. Aging for 432 hours results in a purely monoclinic phase.

X-ray diffraction patterns of the calcined samples obtained were recorded using Cu-Kα radiation.

FIG. 1, from top to bottom, shows the spectra of the samples without aging and aged for 24 hours, 144 hours and 432 hours, respectively, the intensity I being plotted against the diffraction angle (2 Theta).

The proportion of monoclinic phase was determined by quantitative evaluation of the diffraction patterns. The tetragonal phase gave a signal in the range of $2\theta=29.5$ to 30.5. The monoclinic phase produces 2 signals in the range of $2\theta=27.5$ to 28.5, and 31 to 32. The accuracy of the measurements is about 5 to 10%.

The experiments show that it is possible for the crystalline phase of the zirconium dioxide to be shifted, by aging, toward the monoclinic phase.

EXAMPLE 2

The same procedure was followed as in Example 1, except that the calcination conditions were varied. Heating to the calcination temperature took place at a heating rate of 1° C./min, and the temperature was kept at this level for 4 hours (calcination type A). On the other hand, the samples were put into a furnace preheated to the calcination temperature (calcination type B). The results are listed in the following table.

TABLE 1

| Aging times [h] | Aging temperature [° C.] | Calcination temperature [° C.] | Calcination time [h] | Calcination type | 1BET surface area [m²/g] | Crystalline phase |
|---|---|---|---|---|---|---|
| 432 | 90 | 300 | 4 | A | 160 | monoclinic |
| 432 | 90 | 300 | 3 | B | 160 | monoclinic |
| 432 | 90 | 250 | 4.5 | B | 160 | monoclinic |
| 432 | 90 | 400 | 4 | B | 130 | monoclinic |
| 432 | 90 | 400 | 6 | B | 115 | monoclinic |

The zirconium oxides obtained had an entirely monoclinic phase. It was possible to prepare monoclinic zirconium dioxide having a very high BET surface area.

EXAMPLE 3

Again, the same procedure was carried out as in Example 1. The precipitate was aged over various periods at various temperatures, whereupon the precipitation product was filtered off, washed with distilled water and dried at 90° C. for 24 hours. It was then heated, at a heating rate of 1° C./min, to 300° C. and kept at this temperature for 4 hours. The results are shown in the following Table 2.

TABLE 2

| Aging time [h] | Aging temperature [° C.] | BET surface area [m²/g] | Crystalline phase |
|---|---|---|---|
| 432 | 90 | 160 | monoclinic |
| 24 | 135 | 160 | monoclinic |

The results demonstrate that the aging time can be significantly reduced by an increase in the aging temperature, monoclinic zirconium dioxide having a high surface area again being obtained.

EXAMPLE 4

Again, the same procedure was followed as described in Example 1, except that after the precipitation the liquid phase obtained, which contains the precipitation product, was admixed with ammonium sulfate solution (Fluka, 99%) so that the final concentration was 0.5 M. The suspension was stirred for 2 hours and then underwent further processing as described in Example 1. The results for different aging times are shown in the following table.

TABLE 3

| Aging time [h] | Calcination temperature [° C.] | BET surface area [m²/g] | Crystalline phase |
|---|---|---|---|
| 0 | 550 | 14 | tetragonal |
| 432 | 550 | 113 | monoclinic |

For the sulfated zirconium dioxide a high calcination temperature affords a high BET surface area.

Comparative Example A
(Appl. Catal. 57 (1990), pp. 128–129)

A zirconyl nitrate solution with a $ZrO_2$ content of 15% by weight was prepared by zirconium carbonate (about 43% by weight of $ZrO_2$) being dissolved in concentrated nitric acid. Into water introduced as an initial charge, aqueous ammonia (12.5% by weight $NH_3$) and zirconyl nitrate solution were pumped simultaneously with stirring, the pH being kept constant at 9.3 during the precipitation. After a post-reaction stirring period of 10 minutes the pH was set to 7.5 by means of nitric acid to eliminate the unpleasant smell.

The precipitation product was washed, dried and calcined at 400° C. A finely crystalline powder was obtained which consisted of 60% of tetragonal and 40% of monoclinic zirconium dioxide.

Comparative Example B
(in accordance with FR-A-25 90 887, Example 1)

From 60% strength nitric acid and zirconium dioxide (about 44% by weight of $ZrO_2$) with subsequent dilution with deionized water, a solution was prepared which contained 3.75% by weight of $ZrO_2$ (0.3 molar).

A stirred vessel was charged with the solution (pH=0.75). Aqueous ammonia (25% by weight of $NH_3$) was then pumped in, over a period of 6 minutes, up to a pH of 10.4.

The precipitation product was washed on a filter press until the runoff at a constant conductivity of 20 μm/cm and was then dried at 120° C. and calcined for 2 hours at 400° C. The zirconium dioxide obtained with a BET surface area of 149 m²/g was finely crystalline and contained about 80% of the tetragonal and about 20% of the monoclinic modification.

Comparative Example C
(in accordance with Catalysis Today 20 (1994) p. 296)

A zirconyl nitrate solution having a $ZrO_2$ content of 15% by weight was prepared by zirconium carbonate (about 43% by weight of $ZrO_2$) being dissolved in concentrated nitric acid and was refluxed with stirring; the pH was below 1. After about 10 minutes clouding occurred, which intensified on further boiling, eventually resulting in precipitation. After the solution had been refluxed for 50 hours, the precipitate was filtered off, washed, dried and calcined at 400° C. The product had a BET surface area of 155 m²/g and consisted of 80% of tetragonal and 20% of monoclinic $ZrO_2$.

Comparative Example D
(in accordance with EP-A-0 716 833, Example 1)

Dissolving zirconium carbonate (about 43% by weight of $ZrO_2$) in concentrated nitric acid afforded a zirconyl nitrate solution which contained 19% by weight of $ZrO_2$ and had a density of 1.57 g/ml.

A stirred vessel was charged with aqueous ammonia (12.5% by weight of NH3), and the zirconyl nitrate solution was then pumped in over a period of 60 minutes with stirring, until a pH of 7.5 had been reached. In the process the temperature rose to 54° C. After a post-reaction stirring time of 10 minutes washing was carried out on a filter press until the runoff had a conductivity of 20 μm/cm, followed by drying at 120° C. and calcination at 400° C.

The product was finely crystalline and had a BET surface area of 81 m²/g. It consisted of 95% of monoclinic and 5% of tetragonal zirconium dioxide.

We claim:

1. A process for preparing zirconium dioxide which is at least 80% by weight monoclinic and which has a BET surface area of at least 100 m²/g, which process consist essentially of admixing an essentially pure aqueous zirconyl solution with ammonia until a precipitation product and aqueous phase are formed and the pH after precipitation is from 4 to 5;

aging the precipitation product in aqueous phase at a temperature of from 20 to 250° C. for at least two hours;

drying the aged precipitation product; and then calcining the precipitation product at a temperature of from 200 to 600° C.

2. The process of claim 1, wherein the resultant zirconium dioxide is at least 95% by weight monoclinic.

3. The process of claim 1 wherein the source of the zirconyl radical is zirconium chloride or zirconium carbonate.

4. The process of claim 1 wherein the aging time is at least 24 hours.

5. The process of claim 1 wherein the aging temperature is from 70 to 250° C.

6. The process of claim 1 wherein the calcination temperature is from 250 to 400° C.

* * * * *

UNITED STATES PATENT AND TRADEMARK OFFICE
CERTIFICATE OF CORRECTION

PATENT NO. : 6,034,029
DATED : March 7, 2000
INVENTOR(S) : WULFF-DÖRING et al.

It is certified that error appears in the above-identified patent and that said Letters Patent is hereby corrected as shown below:

Column 7, claim 1, line 7, change "consist" to --consists--.

Signed and Sealed this

Twelfth Day of December, 2000

Attest:

Q. TODD DICKINSON

*Attesting Officer*  *Director of Patents and Trademarks*